D. C. SWANDER.
RIM.
APPLICATION FILED JULY 22, 1918. RENEWED OCT. 24, 1921.

1,417,285.

Patented May 23, 1922.

Inventor
DAN C. SWANDER.
By
Attorney

UNITED STATES PATENT OFFICE.

DAN C. SWANDER, OF CLEVELAND, OHIO, ASSIGNOR TO THE STANDARD PARTS COMPANY, OF CLEVELAND, OHIO, A CORPORATION OF OHIO.

RIM.

1,417,285. Specification of Letters Patent. Patented May 23, 1922.

Application filed July 22, 1918, Serial No. 246,038. Renewed October 24, 1921. Serial No. 510,102.

*To all whom it may concern:*

Be it known that I, DAN C. SWANDER, a citizen of the United States, and a resident of Cleveland, county of Cuyahoga, State of Ohio, have invented certain new and useful Improvements in Rims, of which the following is a specification.

This invention relates to vehicle rims and more particularly to what is known as a transplit rim which usually comprises a band with integral side flanges, split at one point in its circumference, and provided with means for locking the ends together.

It is the object of the present invention to provide a rim of this type which has a substantial and durable locking device and which may be economically manufactured and which will also be interchangeable with certain other rims on wheels now in use and which have become, to a large extent, standard in this country.

Figure 1:
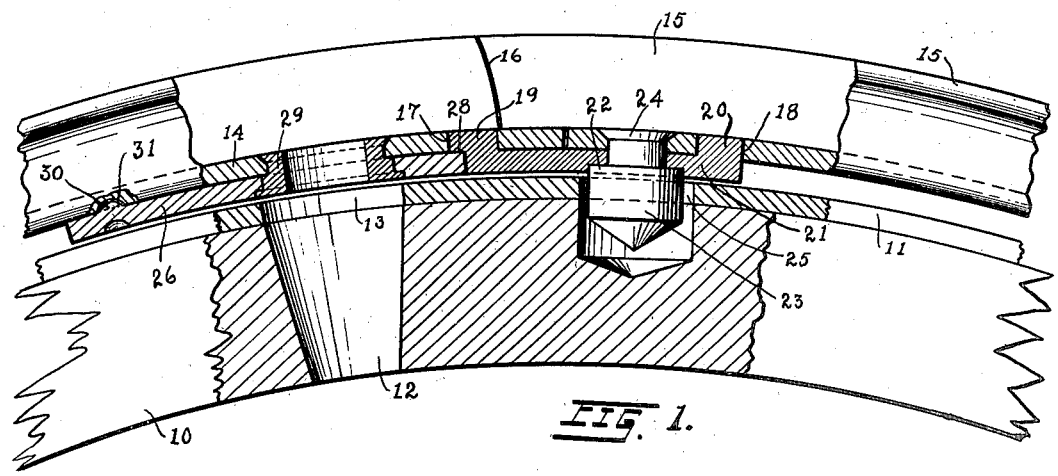
Figure 2:
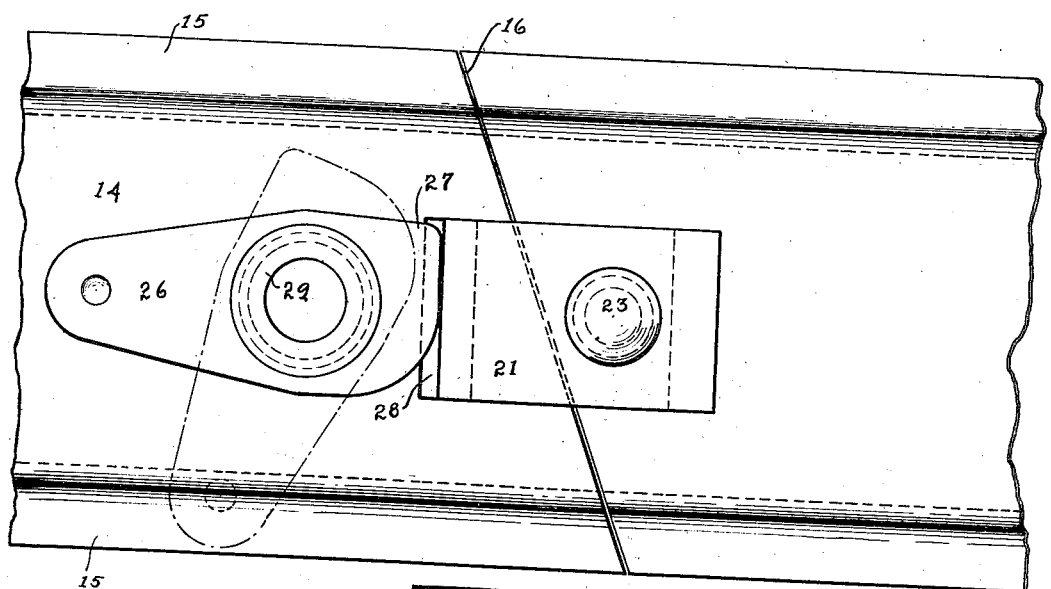

One embodiment of the invention is illustrated in the the accompanying drawings of which, Figure 1 is a fragmentary side elevation of the wheel felloe and rim, certain parts being shown in section; and Figure 2 is a plan view of the inner side of the rim at the split.

Referring to the drawings, 10 indicates the usual wood felloe on which there is arranged the felloe band 11. The usual opening 12 for the valve stem of the tire is provided in the felloe and there is a corresponding opening 13 in the felloe band. Surrounding the felloe band, is the tire carrying rim 14 which has the usual integral side flanges 15 and is transplit at 16. The split 16 may be on a diagonal, as indicated in Figure 2, or may be in accordance with any of the other well known practices. On opposite sides of the split 16, there are perforations 17 and 18, preferably rectangular, as shown, to receive the tongues 19 and 20, respectively, on the latch plate 21. The latch plate 21 has a recess 22 in its inner side to receive the head of the rivet 23 which extends through the latch plate and the rim 14 and is riveted, as indicated, at 24, thereby rigidly securing the latch plate 21 to one end of the rim. The rivet 23 projects inwardly from the plate 21 through an opening 25 in the felloe band and serves as a driving connection between the wheel and rim.

In order to lock the tongue 19 in perforation 17, a locking lever 26 is provided and has its end 27 formed to engage with the shoulder 28 on the plate 21. The lever 26 is pivotally secured to the rim 14 by means of the hollow rivet 29, the axis of the rivet being in alignment with the openings 12 and 13 and adapted to receive the valve stem of the tire so that this stem, when the rim is in use, will project through the rivet 29.

A slight projection 30 on the lever 26 enters a recess 31 therefor on the inner face of the rim 14, for the purpose of securing the lever in the locked position shown in Figures 1 and 2.

From Figure 2, will be observed that when the lever 26 is thrown to the broken line position the end 27 is dis-engaged from the shoulder 28 of the plate 21 and, therefore, the tongue 19 may be dis-engaged from the perforation 17 and the rim ends separated for removal or replacement of the tire. Since the latch plate 21 is rigidly secured to one end of the rim and crosses the split, the other end of the rim in which the valve stem is located cannot be moved radially inwardly, so that careless manipulation, which might result in injury to the valve stem, is impossible. In removing a tire, the end of the rim bearing the latch plate 21 is moved first radially inwardly and then laterally, if desired, and the bead of the tire progressively lifted over the flange of the rim until the tire, as a whole, can be lifted from the rim, the valve stem being held in the opening in the hollow rivet 29 until the tire is thus lifted off. When it is desired to secure the ends of the rim together, the tongue 19 is arranged in the perforation 17 and the lever 26 swung to the position shown in full-lines in Figure 2, thereby positively securing the ends of the rim together.

Having thus described my invention, what I claim is:—

1. A transplit vehicle rim having perforations in its opposite ends, a latch plate having tongues projecting into and fitting said perforations and a recess in its inner side, a rivet seated in and fitting said recess and securing said plate rigidly to one end of the rim and projecting inwardly from said plate to constitute a driver for the rim, and a locking lever pivoted on the opposite side of the split from said rivet and adapted to swing into and out of locking engagement with said plate.

2. A transplit vehicle rim having perforations in its opposite ends, a latch plate having tongues projecting into said perforations and a recess in its inner side, a rivet seated in said recess and securing said plate rigidly to one end of the rim and projecting inwardly from said plate to constitute a driver for the rim, and a locking lever pivoted on the opposite side of the split from said rivet and adapted to swing into and out of locking engagement with said plate and a hollow pivot for said lever adapted to receive the valve stem of a tire.

In testimony whereof I affix my signature.

DAN C. SWANDER.